United States Patent [19]

Inoue et al.

[11] Patent Number: 5,301,145
[45] Date of Patent: Apr. 5, 1994

[54] METHOD AND APPARATUS FOR RECORDING AND READING INFORMATION, AND AN INFORMATION RECORDING ELEMENT

[75] Inventors: Atsuhisa Inoue; Mariko Ishino; Hiroshi Taniguchi, all of Nara; Yoshiro Akagi, Osaka; Yoshiharu Nakajima, Nara, all of Japan

[73] Assignee: Sharp Kabushiki Kaisha, Osaka, Japan

[21] Appl. No.: 936,870

[22] Filed: Aug. 27, 1992

Related U.S. Application Data

[63] Continuation of Ser. No. 728,764, Jul. 8, 1991, abandoned, which is a continuation of Ser. No. 218,736, Jul. 13, 1988, abandoned.

[30] Foreign Application Priority Data

Jul. 13, 1987 [JP] Japan .................. 62-174438

[51] Int. Cl.$^5$ ................. G11C 7/00; G11C 13/04
[52] U.S. Cl. ................. 365/106; 365/153; 365/118; 365/126; 365/113
[58] Field of Search ............... 365/106, 113, 118, 126, 365/153; 430/495

[56] References Cited

U.S. PATENT DOCUMENTS

| | | | |
|---|---|---|---|
| 350,441 | 9/1970 | Ovshinsky | 365/113 |
| 3,519,422 | 7/1970 | Gaynor | 365/126 X |
| 3,530,441 | 9/1970 | Ovshinsky | 365/126 X |
| 4,032,901 | 6/1977 | Levinthal | 365/118 |
| 4,371,954 | 2/1983 | Cornet | 365/106 X |
| 4,404,656 | 9/1983 | Cornet | 365/126 |
| 4,574,366 | 3/1986 | Potember et al. | 365/153 |
| 4,647,947 | 3/1987 | Takeoka et al. | 365/126 X |
| 4,684,598 | 8/1987 | Potember et al. | 365/110 X |
| 4,737,934 | 4/1988 | Ross et al. | 365/106 |
| 4,806,995 | 2/1989 | Day et al. | 365/153 X |
| 4,819,210 | 4/1989 | Miura et al. | 365/106 |
| 4,831,110 | 5/1989 | Kanno et al. | 365/126 X |
| 4,839,861 | 6/1989 | Ikegawa et al. | 365/106 X |
| 5,058,061 | 10/1991 | Koshino et al. | 365/106 |

*Primary Examiner*—Alyssa H. Bowler
*Attorney, Agent, or Firm*—Morrison & Foerster

[57] ABSTRACT

A method and apparatus for recording and reading information in a recording medium comprising a thin film of an organic compound having polymorphisms. The free energy of each polymorphism is different with each other. Information is recorded in the recording medium by applying energy to the recording medium and transferring locally the polymorphism of the organic compound to another polymorphism of the organic compound. The amount of the energy corresponds to the difference in free energy between the polymorphisms. Information is read from the recording medium by optically discriminating between the optical absorption properties of the polymorphisms.

6 Claims, 5 Drawing Sheets

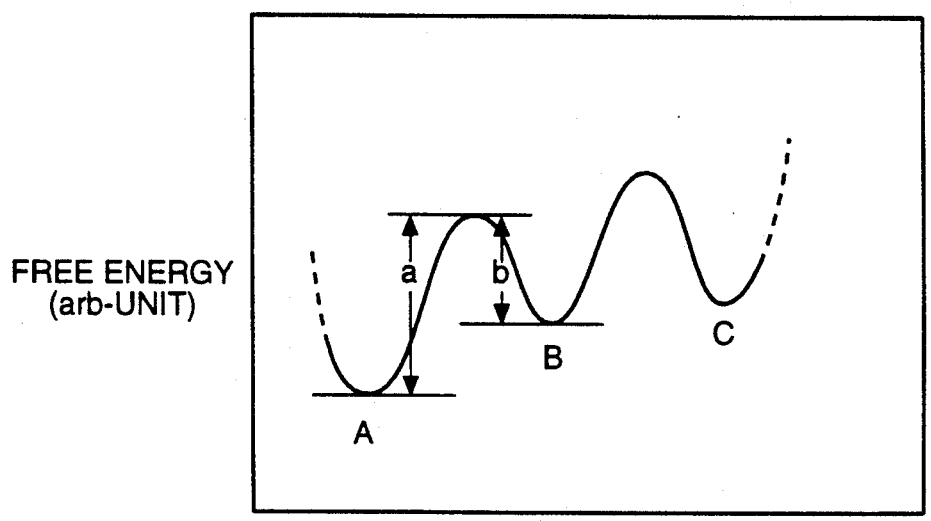
FIG._1

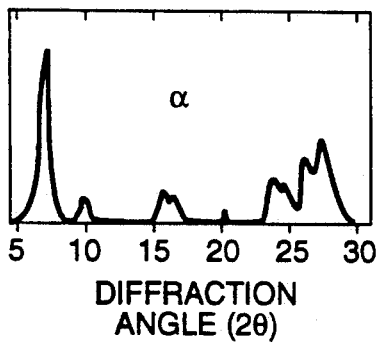
FIG._2A
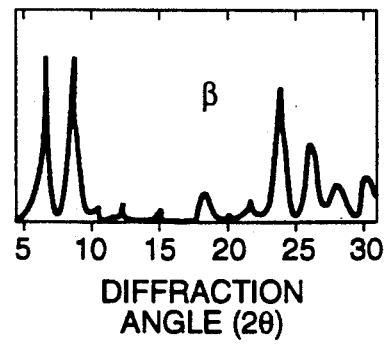
FIG._2B
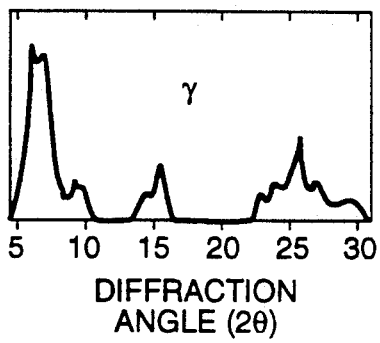
FIG._2C
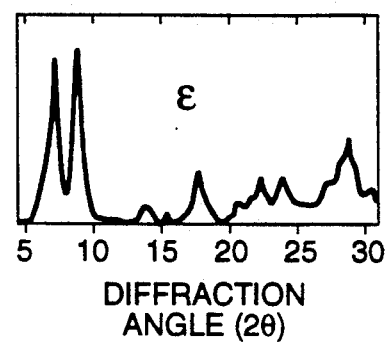
FIG._2D
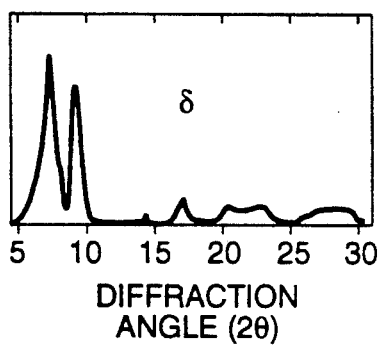
FIG._2E
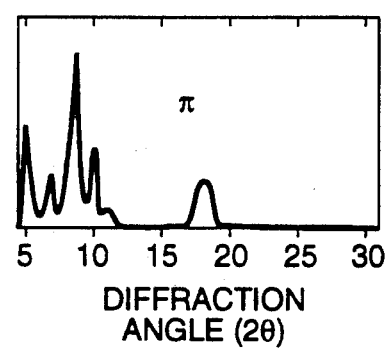
FIG._2F
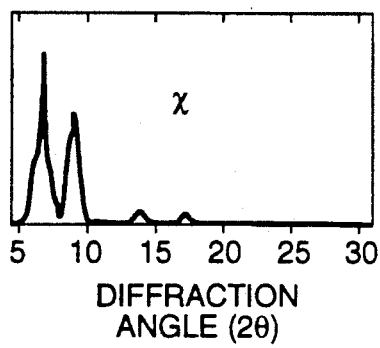
FIG._2G
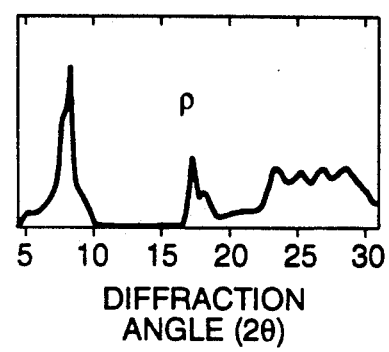
FIG._2H

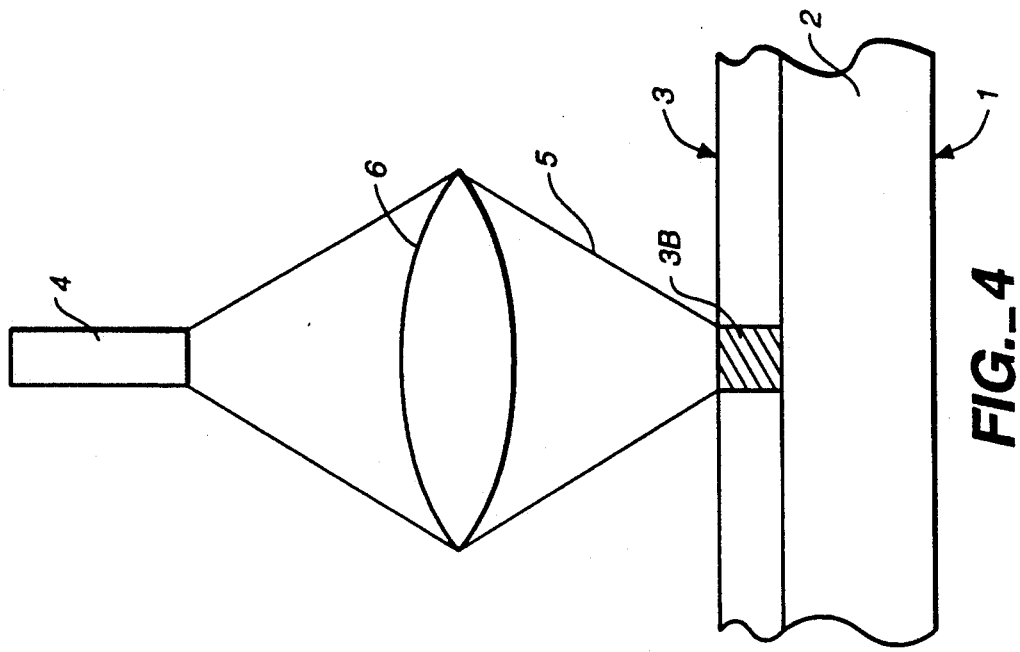
FIG._4
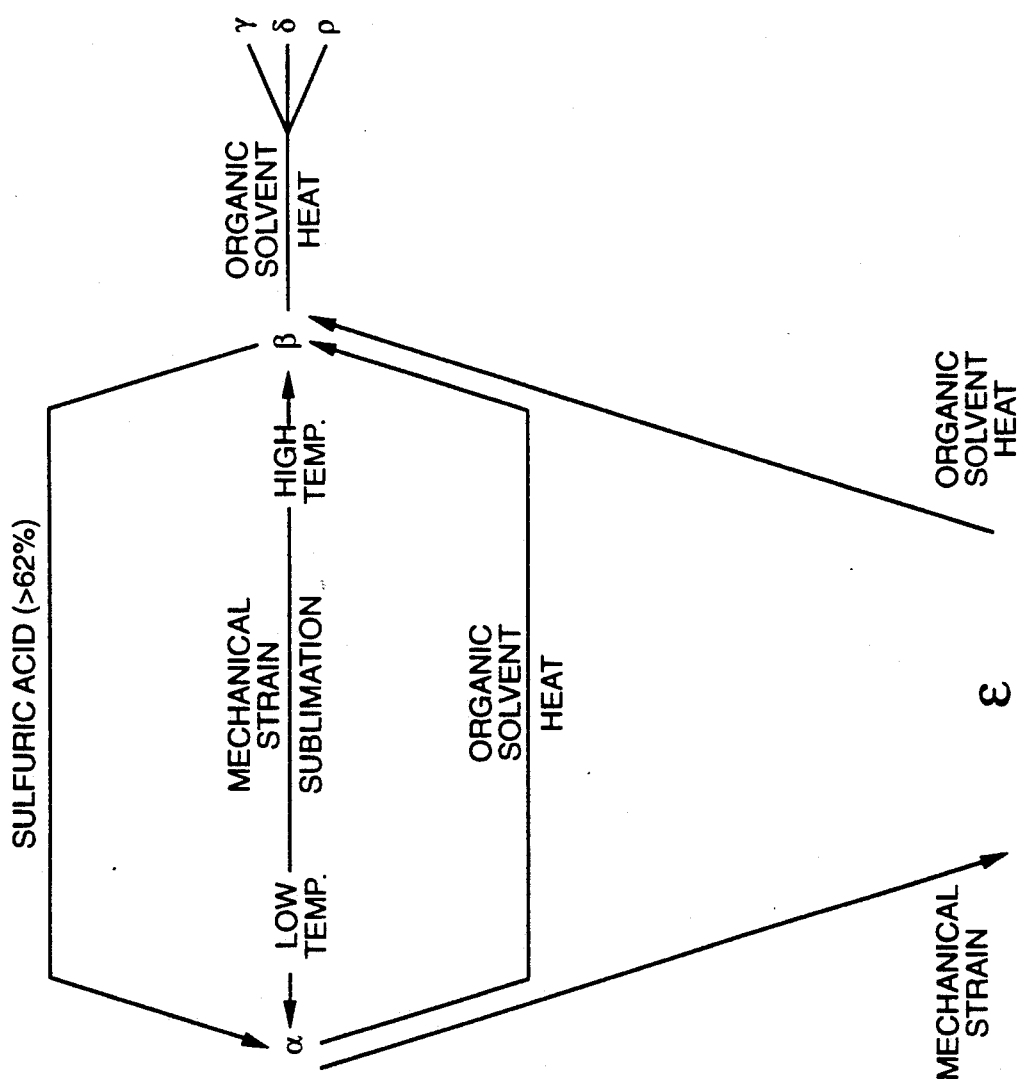
FIG._3

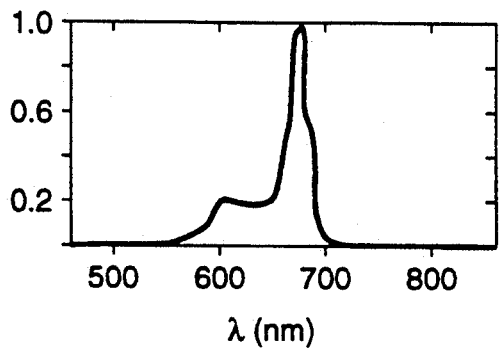
FIG._5A
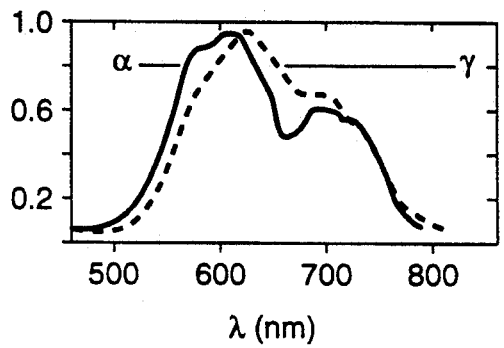
FIG._5B
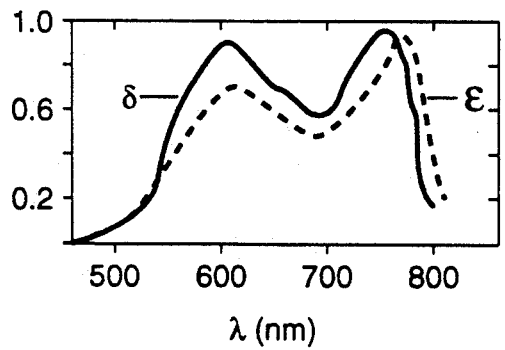
FIG._5C
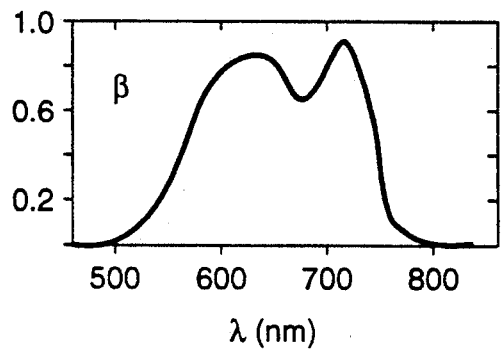
FIG._5D

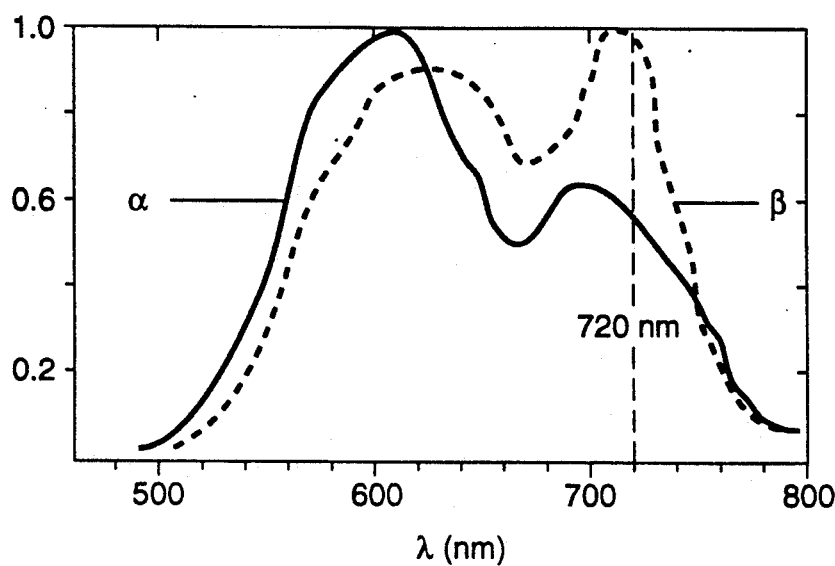
FIG._6
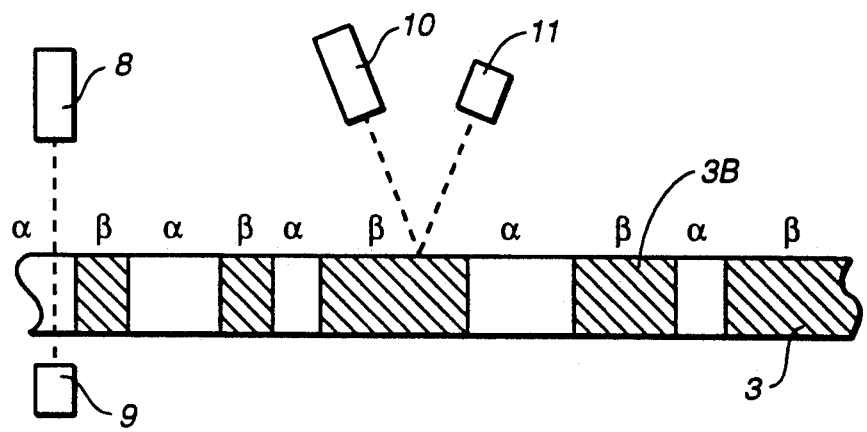
FIG._7

METHOD AND APPARATUS FOR RECORDING AND READING INFORMATION, AND AN INFORMATION RECORDING ELEMENT

CROSS REFERENCES

This application is a continuation of our earlier filed U.S. application Ser. No. 07/728,764, filed Jul. 8, 1991, which application is a continuation of U.S. application Ser. No. 07/218,736, filed Jul. 13, 1988 both (abandoned), which applications are incorporated herein by reference and to which applications we claim priority under 35 USC §120 and is based on Japanese application 62-174438, filed Jul. 13, 1987, which application is incorporated herein by reference and to which application we claim priority under 35 USC §119.

BACKGROUND OF THE INVENTION

1. Field of the Invention

This invention relates to a method and apparatus for recording and reading information, and an information recording element used in the same.

2. Description of the Prior Art

Recently, various types of optical recording elements have been greatly developed. Typical examples of such optical recording elements are of the write once type and the rewritable type. These optical recording elements have a disk comprising a recording medium (typically in the form of a recording thin film) for recording information. It has been proposed to use various substances as a material for a recording thin film, for example, alloys such as TeC, SeTe, and TeOGeInPb, magnetic alloys such as GdTbFe(Co), cyanines, and naphtoquinone organic dyes. These optical recording media record information with a principle based on the magneto-optic effect, photoisomerization, phase transformation effect, etc. Each type of these optical recording media has an advantage.

When information is recorded in an optical recording element of the phase transformation type, a light beam such as a laser beam is used to irradiate a recording film formed in the element to transfer the state of a material consisting the recording film, i.e., from crystal to amorphous. This process is described in U.S. Pat. No. 3,530,441 in the name of Energy Conversion Devices, Inc. As a recording film used in this process or similar process, a tellurium-tin-selenium film, a tellurium oxide film, and a selenium-indium-antimony film have been developed. When manufacturing an optical recording element of the phase-change type, a substrate on which a suitable material is deposited is heated, and thereafter gradually cooled so that the state of the material is transferred from amorphous to crystal. Hence, the manufacturing process of an optical recording element of this type requires a prolonged period of time and rather complicated procedures.

An optical recording element of the write once type has a recording film made of an alloy. Information is recorded in the form of a series of pits or grooves which are formed in the recording film by irridiation with a laser beam. Therefore, this process requires a large amount of energy when information is recorded.

In a rewritable optical recording element, which has been put into a practical use, information is recorded and read out using the photomagnetic effect. When information is read out from the rewritable optical recording element, changes in the polarizing angle of material in the recording film which are caused by the Kerr effect are detected by a suitable detecting means. Such a detecting means must detect the changes with very high precision and stability because the Kerr rotational angle of a material is very small (usually, smaller than 1 degree). However, materials showing a larger Kerr effect and also having a smaller coersive force have not yet been developed.

SUMMARY OF THE INVENTION

The method of recording and reading information of this invention overcomes the above-discussed and numerous other disadvantages and deficiencies of the prior art. In a method of recording and reading information of this invention, a thin film of an organic compound having polymorphisms is used as a recording medium, the free energy of each polymorphism being different with each other, information is recorded in said recording medium by applying energy to said recording medium and transferring locally the polymorphism of said organic compound to another polymorphism of said organic compound, the amount of said energy corresponding to the difference in free energy between said polymorphisms, and information is read from said recording medium by optically discriminating between the optical absorption properties of said polymorphisms.

An apparatus for recording and reading information of the invention comprises a recording medium including a thin film of an organic compound having polymorphisms, the free energy of each polymorphism being different with each other; an information recording means which applies energy to said recording medium to transfer the polymorphism of said organic compound to another polymorphism; and an information reading means which optically discriminates between the optical absorption properties of said polymorphisms.

An information-recording element of the invention comprises a thin film of an organic compound which has polymorphisms, the free energy of each polymorphism being different with each other.

In a preferred embodiment, the organic compound is selected from the group consisting of naphthalene, anthracene, tetracene, pentacene, pyrene, perylene, ovalene, anthanthrene, coronene violanthrane, isoviolanthrene, pyranethrene, indanthradine, 1,9,4,10-anthradipyrimidine, stilbene, 4-phenyl-stilbene, m-dinaphthanethrene, p-diphenylbenzene, phthalocyanine, and compounds of the above substances.

In a preferred embodiment, the organic compound is selected from quinacridones.

In a preferred embodiment, the organic compound is a quinone compound.

In a preferred embodiment, the organic compound is paraffin.

Thus, the invention described herein makes possible the objectives (1) a method for recording and reading information in which information can be recorded using a smaller amount of energy as compared with that required in a method of the prior art; (2) a method for recording and reading information in which the detection of information can be conducted easily; (3) an apparatus for recording and reading information which can record information using a small amount of energy; (4) an apparatus for recording and reading information which can record information easily; (5) an information recording element in which information can be recorded using a small amount of energy; (6) an information recording element from which information can be read easily; and (7) an information recording element which can be manufactured easily.

It is known that many kinds of organic compounds have polymorphisms, which are slightly different from each other in crystal structure. The stability of each structure will be generally illustrated in FIG. 1 showing a free energy diagram of an organic compound. In FIG. 1, polymorphisms are designated by A, B and C, and the differences between the levels of free energy are shown by a and b. Each of the polymorphisms A, B and C is a thermodynamically stable state.

When an energy, the level of which corresponds to the energy difference b, is supplied to a crystal or crystalline thin film having a structure of the polymorphism B, the structure of the crystal or crystalline thin film is transferred to the polymorphism A. Conversely, the structure of the polymorphism A can be transferred to that of the polymorphism B when an energy the level of which corresponds to the energy difference a is supplied. These transfers in structure between polymorphisms can be conducted reversibly.

Energy difference between polymorphisms of an organic compound, which correspond to the energy differences a and b in FIG. 1, are relatively small when compared with those of an inorganic compound. When a portion of a crystal or crystalline thin film of an organic compound having a uniform structure of a polymorphism is irradiated by light, heat, electron beam or the like, the structure of the irradiated portion is transferred to another polymorphism. Optical properties of an organic compound depend mainly on its molecular structure. Polymorphisms of an organic compound vary slightly in molecular configuration so that molecules in a polymorphism interact with each other in a manner different from those in another polymorphism, resulting in different light absorption properties among polymorphisms of a same organic compound.

According to the invention, when information is recorded, a portion of a recording film (recording medium) is irradiated by light, heat, electron beam or the like so that the crystal structure of the portion is transferred into another polymorphism. As a result, the wavelength dependance of optical absorption of the irradiated portion differs from that of the other portion of the recording medium in which the crystal structure is not transferred. When information is read from the recording medium, transmitted light or reflected light is detected. More specifically, the level changes of light of a given wavelength in transmitted or reflected light are detected.

BRIEF DESCRIPTION OF THE DRAWINGS

This invention may be better understood and its numerous objects and advantages will become apparent to those skilled in the art by reference to the accompanying drawings as follows:

FIG. 1 is a diagram illustrating free energy of each of polymorphism of an organic compound.

FIGS. 2(a) to 2(b) are diagrams illustrating X-ray diffraction patterns of the polymorphisms of copper phthalocyanine.

FIG. 3 is a diagram showing the transfer between the polymorphisms of copper phthalocyanine.

FIG. 4 is a schematic view illustrating a method and apparatus for recording information according to the invention.

FIGS. 5(a) to 5(d) are spectrum diagrams showing optical absorption properties of the polymorphisms of copper phthalocyanine.

FIG. 6 is a spectrum diagram showing the difference between optical absorption properties of the alpha and beta type polymorphisms of copper phthalocyanine.

FIG. 7 is a schematic view illustrating a method and apparatus for reading information according to the invention.

DESCRIPTION OF THE PREFERRED EMBODIMENTS

Embodiments of the invention in which copper phthalocyanine (hereinafter, abbreviated as "Cu-Pc") is used as a material of the crystal or crystalline thin film will be described. It has been known that Cu-Pc crystal has various polymorphisms such as $\beta$ type (stable state), and $\alpha$ type (metestable states). FIGS. 2(a) to 2(h) show an X-ray diffraction pattern of each type of the polymorphisms ($\alpha$, $\beta$, $\gamma$, $\epsilon$, $\delta$, $\pi$, $\chi$ and $\rho$ types), respectively. FIG. 3 illustrates diagrammatically the relations between the polymorphisms. As seen from FIG. 3, the structure of Cu-Pc can be transferred from one polymorphism to another one by subjecting to a recrystallization using a solvent or by applying heat or mechanical stress.

FIG. 4 is a schematic view for illustrating one embodiment of the invention in which a thin film made of $\alpha$ type Cu-Pc is used as a recording medium. An optical memory element 1 comprises a glass substrate 2 on which a crystalline thin film 3 is disposed. The crystalline thin film 3 (thickness: 100 nm) is made of $\alpha$ type Cu-Pc which is disposed by the sublimation (about 450° C.) under vacuum ($1 \times 10^{-5}$ to $1 \times 10^{-6}$ Torr) while the substrate 2 is heated to 150° C. The recording thin film 3 may be formed on the substrate 2 by another method, for example, by vacuum evaporation, or by applying a solution of a high molecular compound in which an organic compound for forming the thin film 3 is dispersed.

The thin film 3 is irradiated through a lens 6 by convergent light 5 (e.g., laser beam), from a source 4. The convergent light 5 may be replaced with electron beam, etc. The irradiated portion 3B of the crystal thin film 3 is heated to about 300° C., whereby the crystal structure of the portion 3B is locally transferred from $\alpha$ type polymorphism (a metastable state) to $\beta$ type polymorphism (a stable state). Consequently, in the thin film 3 of $\alpha$ type polymorphism, the portion 3B of $\beta$ type polymorphism is formed.

If convergent light 5 such as laser beam or electron beam is scanned on the thin film 3 while being switched on and off intermittantly, an arbitrary arrangement of the minute portions 3B of $\beta$ type will be formed in the recording thin film 3 of $\alpha$ type. In this way, information can be recorded in the form of an arrangement of the minute portions 3B of $\beta$ type in the crystalline thin film 3 of $\alpha$ type. The amount of applied energy depends on pulse duration and amplitude of the light 5. It is preferable that the amount of the applied energy is about $2 \times 10^{-20}$ J.

As described above, Cu-Pc crystals show various optical absorption properties in accordance with the type of polymorphism. The optical absorption properties of the polymorphisms of Cu-Pc are shown in FIGS. 5(a) to 5(d) having a horizontal axis indicating a wavelength of light and a vertical axis indicating normalized maximum strength of each spectrum. In FIGS. 5(a) to 5(d), the optical absorption properties of each polymorphism are shown as follows: FIG. 5(a): Cu-Pc in a solution of acetophenol; FIG. 5(b): α type (solid line) and γ type (broken line); FIG. 5(c): δ type (solid line) and ε type (broken line); and FIG. 5(d): β type. FIG. 6 illustrates in more detail the difference between the optical absorption properties of α type and β type of Cu-Pc. The maximum levels of the spectrum strength differ from each other by a degree of ± several % so that they can be regarded as being substantially the same. As seen from FIG. 6, there is a great difference in optical absorbance with respect to the wavelength of 720 nm between the optical absorption properties of α type and β type of Cu-Pc.

When a convergent monochromatic light beam (e.g., laser beam) having a wavelength of 720 nm is scanned along a line of minute portions of beta type formed in a recording thin film of α type by the above-mentioned method, the strength of light transmitted through (or reflected from) the minute portions of β type is smaller than the strength of light transmitted through (or reflected from) the recording thin film of α type.

FIG. 7 is a diagrammatic view for illustrating one embodiment of a recording and reading apparatus according to the invention. When transmitted light is to be detected, a light source 8 such as a laser diode is disposed in one side of the recording thin film 3 in which portions are formed, and a detector 9 is disposed in the other side of the thin film 3. When reflected light is to be detected, both a light source 10 such as a laser diode and a detector 11 are disposed in one side of the recording thin film 3. Monochromatic light (wavelength: 720 nm) emitted from the light source 8 or 10 is scanned on the recording thin film 3 at a constant velocity, and transmitted or reflected light is sequentially detected by the detector 9 or 11. From the detected signals, the arrangement pattern of the minute portions 3B of β type formed in the recording thin film 3 of α type can be read out to reproduce the recorded information by a method known in the field.

In the foregoing description, the recording thin film 3 made of Cu-Pc is illustrated. The material of a recording medium is not restricted to Cu-Pc, and can be selected from a wide variety of organic compounds. Examples of organic compounds useful as a material of a recording material according to the invention are as follows: naphthalene, anthracene, tetracene, pentacena, pyrene, perylene, ovalene, anthanthrene, coronene violanthrene, isoviolanthrene, pyranethrane, indanthradine, 1,9,4,10-anthradipyrimidine, stilbene, 4-phenyl-stilbene, m-dinaphthanethrene, p-diphenylbenzene, phthalocyanine, and compounds of the above-exemplified substances; quinacridones; quinones such as flavanthrone, indanthrone, pyranithrone, violanthrone, isoviolanthrone, 5,6-(N)-pyridino-1,9-benzanthrone, and m-dinathanethrone; and paraffin.

According to the invention, information can be recorded by a lower energy (e.g., by a laser beam of a smaller power) as compared with that required in a recording system of the prior art such as the write only type in which pits are formed in a recording thin film. Hence, a light source of a small output power can be available for recording information. An apparatus for reading information according to the invention can be simple in structure because the level changes in transmitted or reflected light are relatively large and easily detected. According to the invention, moreover, information recording elements can be easily produced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for recording and reading information, comprising:
   a recording medium comprised of a substrate the surface of which has a polymorphic organic compound thereon which compound reversibly changes between a first crystalline form and a second crystalline form wherein the first and second crystalline forms have different amounts of free energy;
   a recording means which generates energy at the polymorphic organic compound in an amount such that the energy changes the crystalline form of the polymorphic organic compound between the first crystalline form and the second crystalline form; and
   a reading means which (a) generates energy at the polymorphic organic compound without changing the crystalline form of the polymorphic organic compound, and (b) detects the energy after it contacts the polymorphic organic compound and determines changes in the energy caused by contacting the first as opposed to the second crystalline form
   wherein the polymorphic organic compound is selected from the group consisting of naphthalene, anthracene, tetracene, pentacene, pyrene, perylene, ovalene, anthanthrene, coronene, violanthrene, isoviolanthrene, pyranethrene, indanthradine, 1,9,4,10-anthradipyrimidine, stilbene, 4-phenyl-stilbene, m-dinaphthanathrene, p-diphenylbenzene and phthalocyanine.

2. The apparatus as claimed in claim 1, wherein the reading means is designed so as to detect the energy after the energy is reflected off of the surface of the polymorphic compound.

3. The apparatus as claimed in claim 1, wherein the reading means is designed so as to detect the energy after the energy passes through the polymorphic compound.

4. The apparatus as claimed in claim 1, wherein the polymorphic organic compound is copper phthalocyanine.

5. An apparatus for recording and reading information, comprising:
   a recording medium comprised of a substrate the surface of which has a polymorphic organic compound thereon which compound reversibly changes between a first crystalline form and a second crystalline form wherein the first and second crystalline forms have different amounts of free energy;
   a recording means which generates energy at the polymorphic organic compound in an amount such that the energy changes the crystalline form of the polymorphic organic compound between the first crystalline form and the second crystalline form; and a reading means which (a) generates energy at the polymorphic organic compound without changing the crystalline form of the polymorphic organic compound, and (b) detects the energy after it contacts the polymorphic organic compound and determines changes in the energy caused by contacting the first as opposed to the second crystalline form, wherein the polymorphic organic compound is selected from the group consisting of quinacridones.

6. An apparatus for recording and reading information, comprising:

a recording medium comprised of a substrate the surface of which has a polymorphic organic compound thereon which compound reversibly changes between a first crystalline form and a second crystalline form where in the first and second crystalline forms have different amounts of free energy;

a recording means which generates energy at the polymorphic organic compound in an amount such that the energy changes the crystalline form of the polymorphic organic compound between the first crystalline form and the second crystalline form; and a reading means which (a) generates energy at the polymorphic organic compound without changing the crystalline form of the polymorphic organic compound, and (b) detects the energy after it contacts the polymorphic organic compound and determines changes in the energy caused by contacting the first as opposed to the second crystalline form, wherein the polymorphic organic compound is selected from the group consisting of paraffin compounds.

* * * * *